United States Patent [19]
Kakuma et al.

[11] Patent Number: 5,504,742
[45] Date of Patent: Apr. 2, 1996

[54] BROADBAND ISDN REMOTE MULTIPLEXER

[75] Inventors: Satoshi Kakuma; Shuji Yoshimura; Shiro Uriu, all of Kawasaki; Naoki Fukuda, Fukuoka, all of Japan

[73] Assignee: Fujitsu Limited, Kanagawa, Japan

[21] Appl. No.: 139,589

[22] Filed: Oct. 20, 1993

[30] Foreign Application Priority Data

Oct. 20, 1992 [JP] Japan .................................. 4-281331

[51] Int. Cl.$^6$ ...................................... H04J 3/12
[52] U.S. Cl. ........................... 370/60.1; 370/68.1
[58] Field of Search ...................... 370/112, 110.1, 370/94.1, 60.1, 60, 56, 52, 53, 54, 84, 79, 68.1, 94.2, 82, 83, 85.13, 43, 49.5, 62, 99; 379/202

[56] References Cited

U.S. PATENT DOCUMENTS 5,101,404  3/1992  Kunimoto et al. ............... 370/60.1
5,204,857  4/1993  Obara ............................. 370/60.1

OTHER PUBLICATIONS

CCITT, Integrated Serviced Digital Network overall Network Aspects and Functions, ISDN User-Network Interfaced, Recommendation I. 362, 1991.

Primary Examiner—Benedict V. Safourek
Assistant Examiner—Dang Ton

[57] ABSTRACT

A broadband ISDN remote multiplexer, which is constructed by separating a subscriber line interfacing section from an ATM exchange and installing the same at a remote location connected via a high-speed transmission line, comprises: a first interface unit for carrying out conversion between a transmitted signal of UNI format, carrying a destination number in its GFC field and transmitted over a transmission medium interconnecting the ATM exchange and the broadband ISDN remote multiplexer, and a first path-control signal that directs a connection within the remote multiplexer in accordance with the destination number; a plurality of subscriber line interface units for terminating respectively the plurality of broadband ISDN subscriber lines; and a multiplexing/demultiplexing unit for making a connection between the first interface unit and each of the subscriber line interface units in accordance with the first path-control signal.

22 Claims, 6 Drawing Sheets

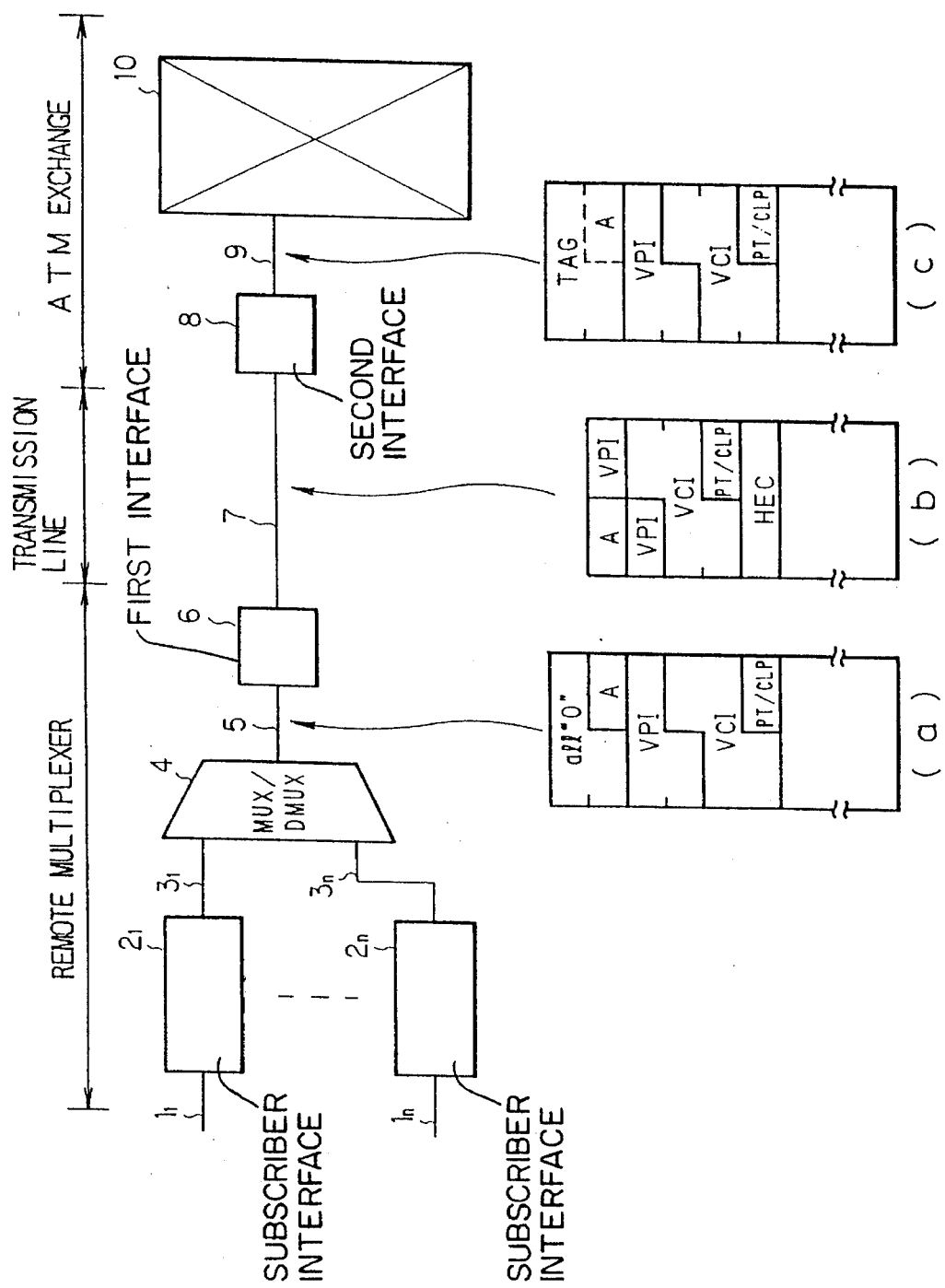

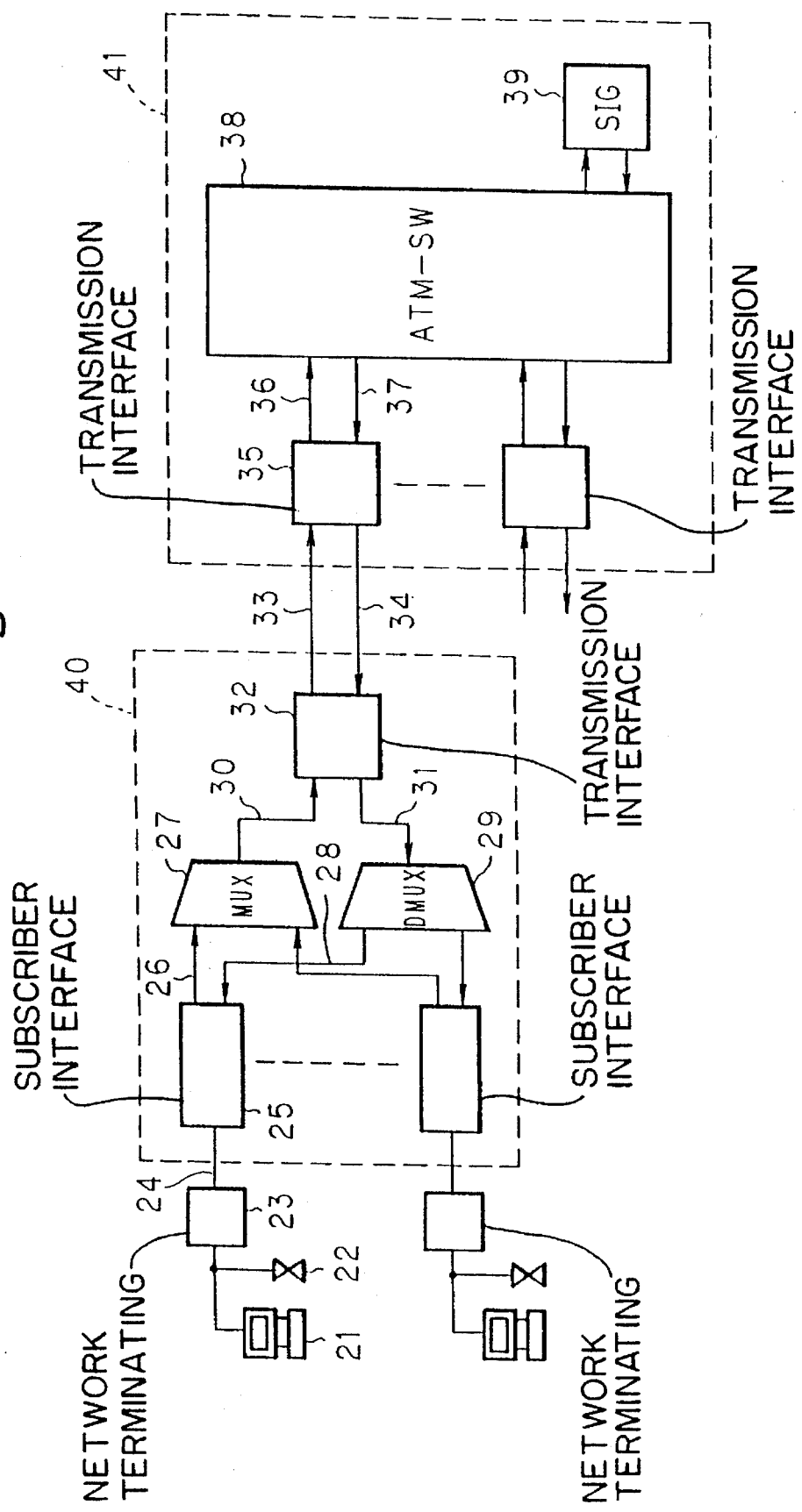

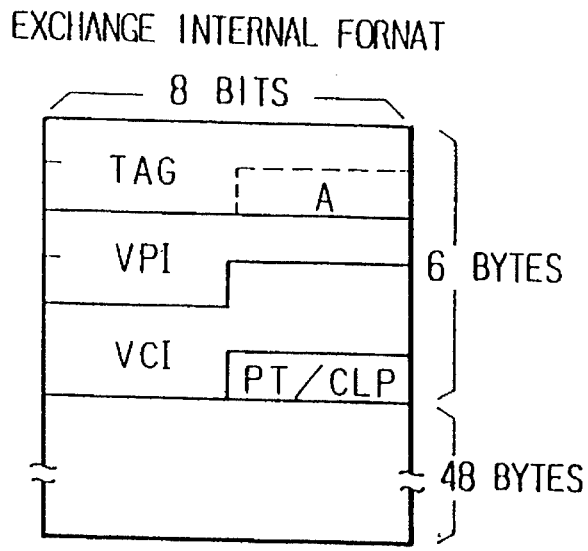
Fig. 3(A) EXCHANGE INTERNAL FORMAT
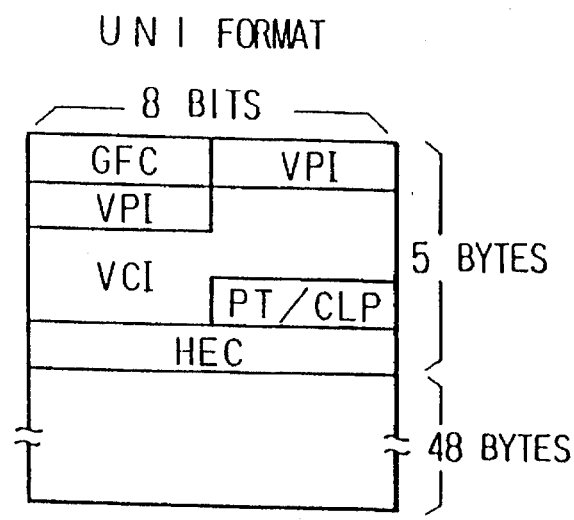
Fig. 3(B) UNI FORMAT
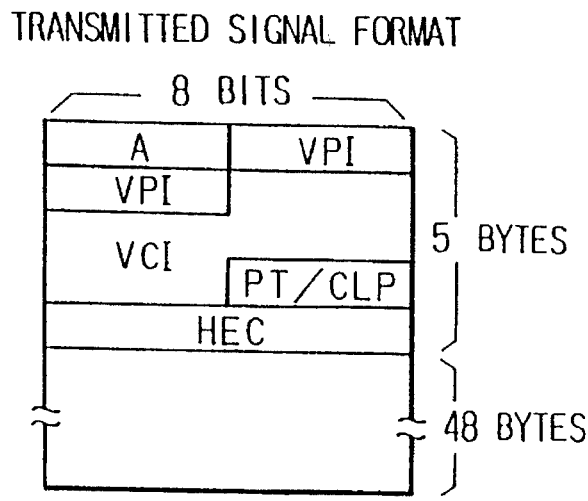
Fig. 3(C) TRANSMITTED SIGNAL FORMAT

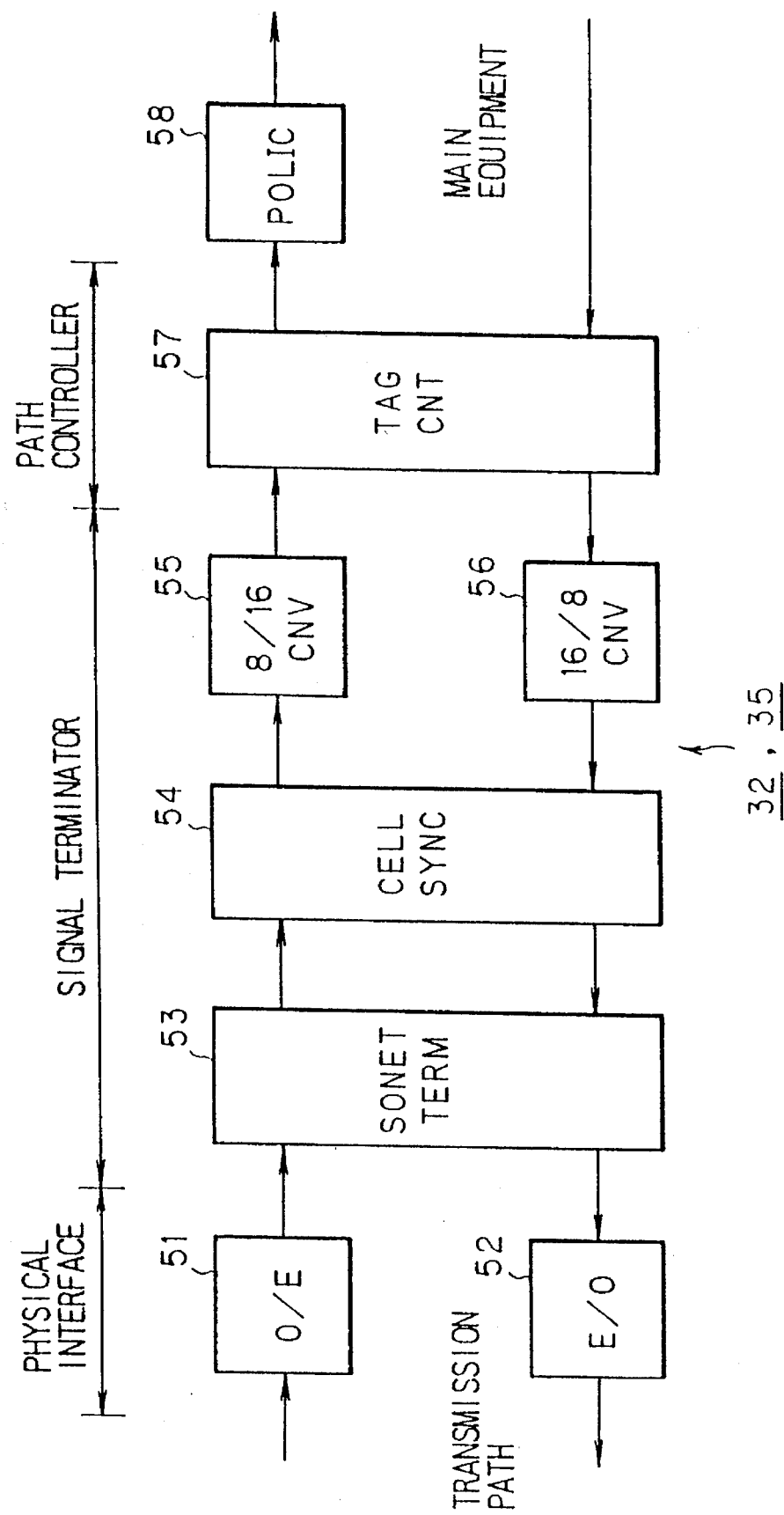

BROADBAND ISDN REMOTE MULTIPLEXER

BACKGROUND OF THE INVENTION

1. Field of the Invention

The present invention relates to a broadband ISDN (hereinafter abbreviated B-ISDN) remote multiplexer for connection to an asynchronous transfer mode (ATM) exchange, and more particularly to a simple, compact, and low-cost B-ISDN remote multiplexer wherein the remote multiplexer is constructed by separating a subscriber line interfacing section from an ATM exchange and installing it at a remote location connected via a high-speed transmission line, the connection and other control operations being performed by the ATM exchange.

2. Description of the Related Art

The cost of switching equipment and the cost of subscriber lines connecting the subscribers to the switching equipment are predominant expenses in the construction of a switched network. Therefore, in conventional telephone networks, a technique generally known as remote multiplexing is widely used whereby a large number of subscriber lines are concentrated at a point near the subscribers and multiplexed on a high-speed or broadband transmission line or the like for transmission to a switching station. Since the reduction of the subscriber line cost is one of its purposes, as noted above, the remote multiplexer is required to have a compact and low-cost construction.

The same situation applies to the B-ISDN, and a compact and low-cost construction is required of the remote multiplexer. However, unlike conventional switched network, the B-ISDN involves so-called label multiplexing using fixed-length ATM cells, dropping ATM cells in the event of line congestion, and so on; therefore, the remote multiplexer is required to have such facilities as management of bands assigned for use, management of call status of connected calls, etc. Providing these facilities in the remote multiplexer, however, causes a problem in view of the above-mentioned purpose of reducing the size and cost of the equipment.

SUMMARY OF THE INVENTION

It is accordingly an object of the invention to provide a B-ISDN remote multiplexer of simple construction wherein the subscriber line interface and subscriber line concentrator are separated from an ATM exchange and installed as a B-ISDN remote multiplexer at a remote location, the remote multiplexer and the exchange being linked via a high-speed transmission line. In this construction, the B-ISDN remote multiplexer is only required to carry out transmission processing such as concentration and multiplexing, and signaling, call switching, and other call servicing operations are performed at the exchange. Therefore, the above-mentioned purpose of reducing the size and cost of the B-ISDN remote multiplexer can be easily achieved. There is a further advantage that no special software is needed in addition to the usual switching processing software at the exchange since the remote multiplexer can be treated as a subscriber line within the exchange without any special consideration to its presence.

It is another object of the invention to provide a simple interface conforming to the UNI (User Network Interface) standard, the standard interface defined by the B-ISDN, for use as the communication interface between the B-ISDN remote multiplexer of the above construction and the ATM exchange. The invention achieves the above purpose of equipment cost reduction through the shared use and hence simplification of the equipment configuration, the reduction of software load, etc.

According to the invention, there is provided a broadband ISDN remote multiplexer for concentrating a plurality of broadband subscriber lines at a remote location for connection to an ATM exchange, comprising: first interface means for carrying out conversion between a transmitted signal of UNI format, carrying a destination number in its GFC field and transmitted over a transmission medium interconnecting the ATM exchange and the broadband ISDN remote multiplexer, and a first path-control signal that directs a connection within the broadband ISDN remote multiplexer in accordance with the destination number; a plurality of subscriber line interface means for terminating respectively the plurality of broadband ISDN subscriber lines; and multiplexing/demultiplexing means for making a connection between the first interface means and each of the subscriber line interface means in accordance with the first path-control signal.

The ATM exchange includes second interface means for connection with the broadband ISDN remote multiplexer, wherein, to establish communication with each of the subscriber line interface means, the second interface means carries out conversion between a second path-control signal that directs a connection with the ATM exchange and the destination number appended to the GFC field of the transmitted signal of UNI format transmitted over the transmission medium.

The first interface means comprises: physical interface means for interfacing with the transmission medium; terminating means for terminating the transmitted signal of UNI format; and first path-control means for interfacing with the multiplexing/demultiplexing means by carrying out conversion between the destination number appended to the GFC field of the transmitted signal of UNI format and the first path-control signal. On the other hand, the second interface means comprises: physical interface means for interfacing with the transmission medium 7; terminating means for terminating the transmitted signal of UNI format; and second path-control means for interfacing with an ATM switch by carrying out conversion between the destination number appended to the GFC field of the transmitted signal of UNI format and the second path-control signal.

BRIEF DESCRIPTION OF THE DRAWINGS

The present invention will be more clearly understood from the description as set forth below with reference to the accompanying drawings wherein:

FIG. 1 is a diagram showing the basic functions of a system using a B-ISDN remote multiplexer according to the present invention;

FIG. 2 is a block diagram showing the configuration of one embodiment of the B-ISDN remote multiplexer of the invention along with the configuration of an ATM exchange;

FIG. 3(A) is a diagram showing an example of an exchange internal signal format used in the configuration of FIG. 2;

FIG. 3(B) is a diagram showing an example of a UNI signal format used in the configuration of FIG. 2;

FIG. 3(C) is a diagram showing an example of a transmitted signal format used in the configuration of FIG. 2;

FIG. 4 is a block diagram showing an example of transmission interface (TINF) configuration;

DESCRIPTION OF THE PREFERRED EMBODIMENTS

Figure 5:
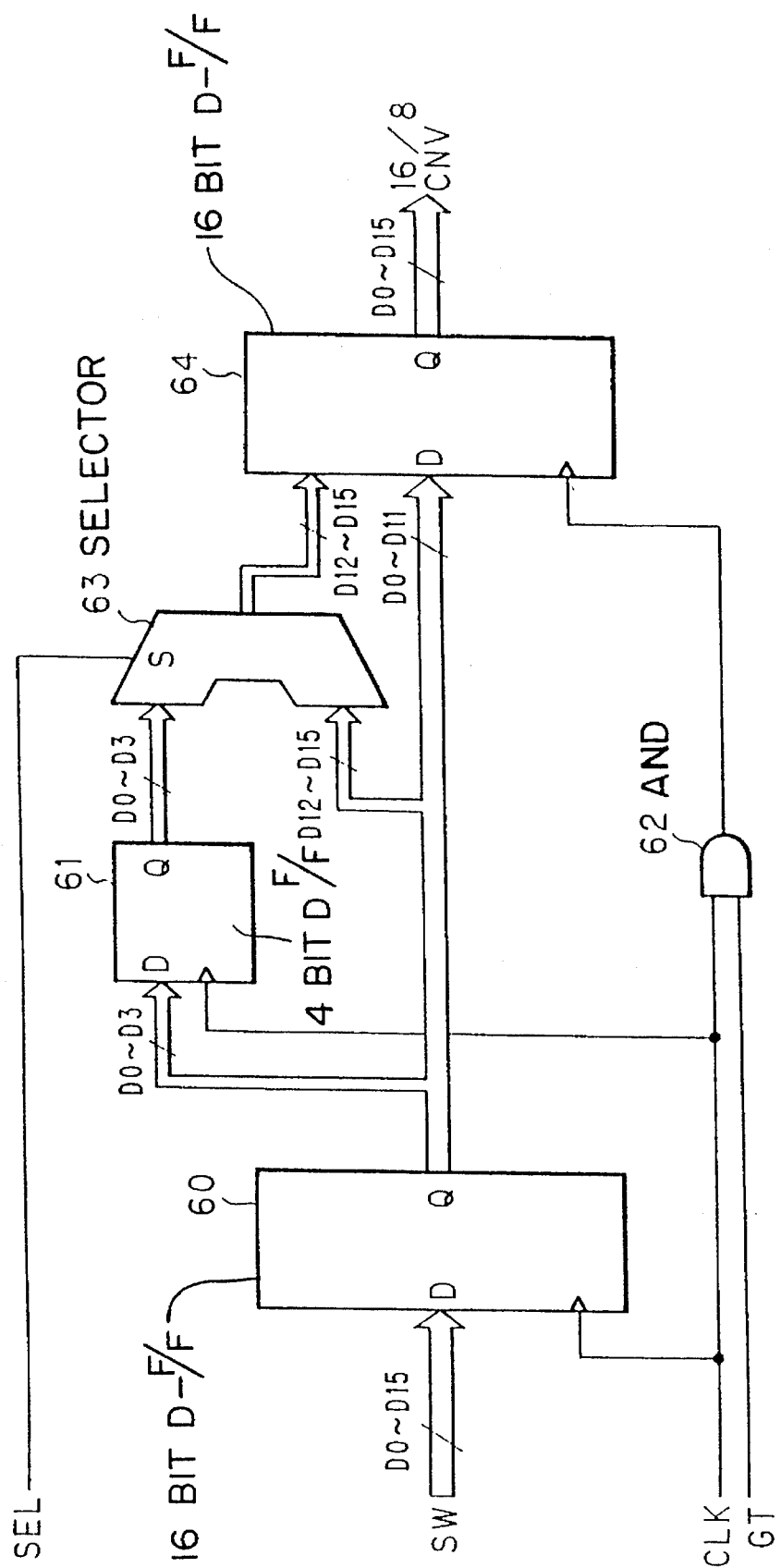
FIG. 5 is a circuit diagram showing an example of a format conversion circuit of a TAG controller for converting a TAG field in the direction from the main equipment to the transmission channel.

FIG. 1 is a diagram showing the basic functions of a system using a B-ISDN remote multiplexer according to the invention. The B-ISDN remote multiplexer concentrates a plurality of broadband B-ISDN subscriber lines at a remote location for connection to an ATM exchange.

In FIG. 1, the B-ISDN remote multiplexer of the invention comprises a first interface means 6, a plurality of subscriber line interface means $2_1$–$2_n$, and a multiplexing/demultiplexing means 4. The first interface means 6 carries out conversion between a transmitted signal of UNI format, carrying a destination number in its GFC field and transmitted over a transmission medium 7 connecting the ATM exchange and the broadband ISDN remote multiplexer, and a first path-control signal that directs a connection within the broadband ISDN remote multiplexer in accordance with the destination number. The plurality of subscriber line interface means $2_1$–$2_n$ terminate a plurality of broadband ISDN subscriber lines $1_1$–$1_n$, respectively. The multiplexing/demultiplexing means 4 connects the first interface means 6 to each of the subscriber line interface means $2_1$–$2_n$ in accordance with the first path-control signal.

The ATM exchange has a second interface means 8 for connection with the broadband ISDN remote multiplexer. To establish communication with each of the subscriber line interface means $2_1$–$2_n$, the second interface means 8 carries out conversion between a second path-control signal that directs a connection with the ATM exchange and the destination number carried in the GFC field of the transmitted signal of UNI format transmitted over the transmission medium.

The first interface means 6 comprises: a physical interface means for interfacing with the transmission medium 7; a terminating means for terminating the transmitted signal of UNI format; and a first path-control means for interfacing with the multiplexing/demultiplexing means 4 by carrying out conversion between the destination number carried in the GFC field of the transmitted signal of UNI format and the first path-control signal. The second interface means 8 comprises: a physical interface means for interfacing with the transmission medium 7; a terminating means for terminating the transmitted signal of UNI format; and a second path-control means for interfacing with an ATM switch 10 by carrying out conversion between the destination number carried in the GFC field of the transmitted signal of UNI format and the second path-control signal.

In FIG. 1, if the first and second interface means 6 and 8 were removed and the lines 5 and 9 were directly connected, that would constitute an ATM exchange of the usual configuration. More specifically, the usual ATM exchange would be constructed with all the block elements from the subscriber line interface means $2_1$–$2_n$ to the ATM switch 10 shown in the figure. According to the B-ISDN remote multiplexer of the present invention, the subscriber line interface means $2_1$–$2_n$ and their multiplexing/demultiplexing means 4 are separated from the ATM exchange and installed at a remote location, and the connection to the ATM exchange is made using the first interface means 6 at the B-ISDN remote multiplexer and the second interface means 8 at the ATM exchange side.

Therefore, the B-ISDN remote multiplexer is only responsible for concentrating and multiplexing the subscriber lines, the first interface means 6 being the only hardware element added to the original configuration. Likewise, the ATM exchange requires the additional provision of the second interface means 8, but its switching processing software need only treat the B-ISDN remote multiplexer as a subscriber line within the exchange without any special consideration to its presence, so that it is basically not necessary to add new processing programs. Furthermore, the first and second interface means 6 and 8 are constructed using an ATM standard interface so that ordinary ATM transmission equipment can be used, thus reducing the overall equipment cost, etc.

In the usual ATM exchange to which the subscriber lines are directly interfaced, one of the subscriber line interface means $2_1$–$2_n$ (one interface means that corresponds to the number A in TAG in FIG. 1(C)) is directly selected using the second path-control signal that directs a connection within the exchange. On the other hand, when the elements up to the multiplexing/demultiplexing means 4 are installed remotely as shown in FIG. 1, the number A needs to be notified to the B-ISDN remote multiplexer.

To achieve this, of the ATM standard interfaces UNI and NNI (Node Network Interface), the UNI format is employed which is capable of transmitting the number A corresponding to the subscriber line interface means $2_1$–$2_n$. More specifically, the number A (indicated by the number A in GFC in FIG. 1(b)) is appended to the GFC (Generic Flow Control) field to control the multiplexing/demultiplexing means 4 situated at a distant location: the GFC field is provided to control contention between multi-connected ATM terminals but is not necessary for communication between the B-ISDN remote multiplexer and the ATM exchange.

Therefore, the first and second interface means 6 and 8 are each provided with a format conversion facility for the number A in addition to the ordinary ATM transmission facilities. The second interface means 8 converts the second path-control signal (shown in FIG. 1(c)) to a signal of the UNI format (shown in FIG. 1(b)) for transmission over the transmission line, while the first interface means 6 converts the signal of the UNI format (shown in FIG. 1(b)) to the first path-control signal (shown in FIG. 1(a)) of the same format as the second path-control signal (FIG. 1(c)). These converting operations are carried out by simple hardware that provides the format conversion facility, and the switching software at the ATM exchange need only carry out subscriber line serving operations as in the usual ATM exchange without having to consider the presence of the B-ISDN remote multiplexer of the present invention.

FIG. 2 is a block diagram showing the configuration of one embodiment of the B-ISDN remote multiplexer of the invention along with the configuration of the ATM exchange. FIGS. 3(A) to 3(B) show the various signal formats used in the present embodiment.

In FIG. 2, a subscriber terminal at a distant location, such as a personal computer 21, telephone 22, or the like, is connected to a network terminating unit (NT) 23. ATM cells formed in accordance with the UNI standard are transmitted over a subscriber line 24 and through the line terminating unit 23 to and from the B-ISDN remote multiplexer 40 of the invention. The B-ISDN remote multiplexer 40 comprises: subscriber line interfacing circuits (SINF) 25 for terminating the respective subscriber lines 24; a multiplex/demultiplex stage consisting of a multiplexing circuit (MUX) 27 for concentrating the plurality of subscriber lines and multiplexing their signals for output, and a demultiplexing circuit (DMUX) 29 for demultiplexing the multiplexed signal to separate individual signals for distribution to the respective subscriber line interfacing circuits; and a transmission interfacing circuit (TINF) 32 for providing connections between the multiplex/demultiplex stage and the ATM exchange 41 via high-speed transmission lines 33 and 34.

The ATM exchange 41, the configuration of which is simplified in connection with the present invention, comprises: an ATM switch 38 for making path connections in accordance with the VPI/VCI of each ATM cell; a signaling processor (SIG) 39 for performing the so-called LAP-D processing, including a call setup procedure, by connecting a signaling cell with a special VPI/VCI via the ATM switch 38 in a semi-fixed manner; and a transmission interfacing circuit (TINF) 35 for connecting the ATM switch 38 to the B-ISDN remote multiplexer 40 via the high-speed transmission lines 33 and 34. In the example shown, each transmission interfacing circuit (TINF) 35 is connected directly to the ATM switch 38, but alternatively, these interfacing circuits may be connected to the ATM switch 38 after concentration or distribution using, for example, a multiplex/demultiplex stage similar to the one described above.

Signal path control within the ATM exchange 41 can be performed in various ways according to the switching system used; in one example, a TAG such as shown in FIG. 3(A) is used for path control. FIG. 3(A) shows an example of a signal format used within the exchange, the format being identical to the standard format, such as UNI and NNI, except that the error-checking HEC field in the standard format is replaced with the TAG field. In the format shown in FIG. 3(A), the high-order 12 bits of the 16-bit (2-byte) TAG are used, for example, to designate a highway number for internal connection within the exchange, and the remaining low-order four bits are used to indicate a destination highway number (the number A in FIG. 3(A)) branching from that designated highway. FIG. 3(B) shows a regular UNI format, and FIG. 3(C) shows the format of a transmitted signal according to the present invention, the format being identical to the UNI format shown in FIG. 3(B) except that the GFC field in the UNI format is replaced with the 4-bit number A designating the destination.

The signal flow between the B-ISDN remote multiplexer 40 and the ATM exchange 41 will be described below with reference to FIG. 2. It is assumed here that the signaling cell transmitted from a calling subscriber at the time of a call request has already been processed by the SIG 39, and also that the settings of the communication VPI/VCI allocation and maintenance information, etc., to be transmitted in accordance with the signaling cell to the receiving subscriber interfacing circuit remotely located from the ATM exchange 41 have already been made.

The ATM cell received by the subscriber line interfacing circuit 25 via the subscriber line 24 is appended with the TAG and converted by an internal VC converter for conversion to VPI/VCI and hence to the exchange internal signal format shown in FIG. 3(A). In this case, the highway number on the communication path within the remote multiplexer is written in the high-order 12-bit area of the TAG field, and the highway number on the communication path at the ATM exchange side is written in the low-order 4-bit area, for example. If the path is fixed, a prescribed number or 0s may be written in the TAG field. The signal is input to the TINF 32 in accordance with the designated highway number. The TINF 32 appends only the low-order four bits of the TAG field to the GFC field of the UNI format (FIG. 3(C)) and appends HEC to the signal for transmission to the ATM exchange 41.

Upon receiving the signal, the TINF 35 at the ATM exchange 41 converts the signal to the exchange internal signal format shown in FIG. 3(A) by appending the high-order 12 bits of the TAG field which designate a communication path within the exchange. In the example shown in FIG. 2, a concentrator or multiplexer is not used between the TINF 35 and the ATM switch 38; if such a device is used, the low-order four bits of the received signal are used to designate the branch highway, etc. It is also possible to designate all the 16 bits, including the low-order four bits of the TAG field, at the exchange side. Using the high-order 12 bits of the TAG field, the ATM switch 38 performs switching for connection to the highway corresponding to the number designated therein.

Next, the signal flow from the ATM exchange 41 to the B-ISDN remote multiplexer 40 will be described. The signal of the exchange internal format is input to the TINF 35 through the ATM switch 38 or other communication path designated by the high-order 12 bits of the TAG field shown in FIG. 3(A). The TINF 35 converts the input signal to the UNI format (FIG. 3(B)) and writes the low-order four bits of the TAG field into the GFC field of the UNI format (FIG. 3(C)). This signal is transmitted to the B-ISDN remote multiplexer 40 over the transmission line 34.

The TINF 32 at the B-ISDN remote multiplexer 40 converts the received signal to the exchange internal format shown in FIG. 3(A). During the conversion, the low-order four bits of the received GFC are written into the low-order 4-bit area of the newly appended TAG, while the high-order 12 bits are filled with 0s, for example. Alternatively, a prescribed value corresponding to the configuration of the remote multiplexer may be written into the high-order 12-bit area. The signal is then input to the demultiplexing circuit 29 which passes it to the branch highway designated by the low-order four bits of the TAG field for transmission to the subscriber line interfacing circuit 25 along that highway.

FIG. 4 is a block diagram showing one example of the configuration of the TINF 32, 35.

By way of example, FIG. 4 shows a transmission interface used in SONET (Synchronous Optical Network), a North American optical network standard. An optical-to-electrical signal converter (O/E) 51 and an electrical-to-optical signal converter (E/O) 52 in the physical interface section carry out conversion between electrical and optical signals for transmission to and from the fiber-optic transmission line. Next, in the signal terminating section, the signal passed through the converter 51 or 52 is terminated using a SONET terminating unit 53, and a cell synchronizing circuit 54 at the next stage synchronizes each ATM cell. An 8/16 converter 55 and a 16/8 converter 56 carry out 8-to-16 and 16-to-8 conversion, respectively, between the transmission line capable of handling 8-bit data at a time and the main equipment capable of handling 16-bit data at high speed. A TAG controller 57 in the path control section, a device added according to the present invention, carries out conversion between the exchange internal signal format (FIG. 3(A)) and the UNI format (FIG. 3(C)) for transmission over the transmission line. A policing circuit 58 has such functions as monitoring the band, etc., assigned for use at the beginning of the communication and discarding cells that exceed the assigned band.

Figure 6:
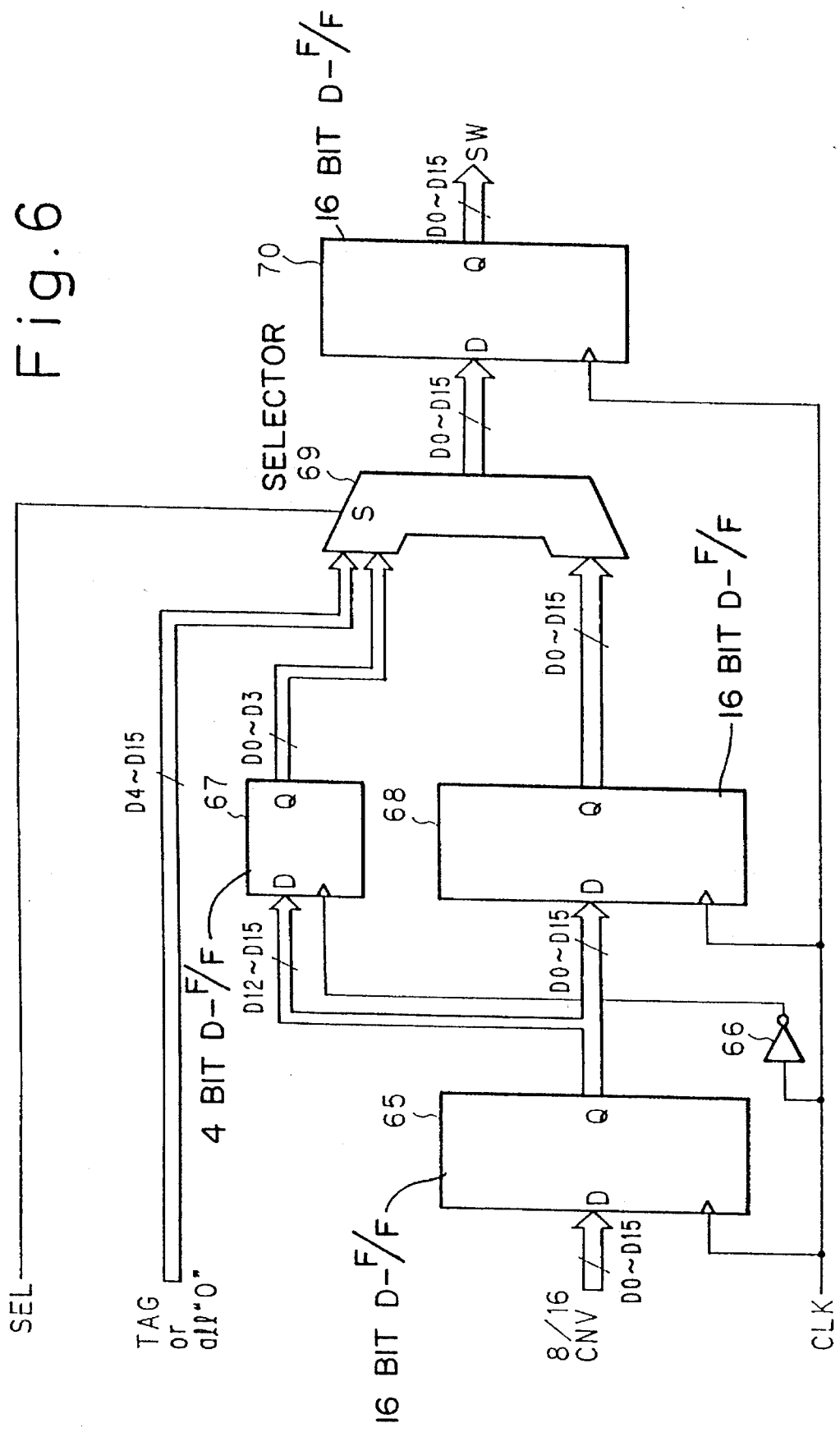
FIG. 6 is a circuit diagram showing an example of a format conversion circuit of the TAG controller for converting the TAG field in the direction from the transmission channel to the main equipment.

FIGS. 5 and 6 are circuit diagrams showing an example of the TAG controller 57 shown in FIG. 4.

FIG. 5 shows an example of a format converting circuit of the TAG controller 57 for converting the TAG field in the direction from the main equipment side to the transmission line side (equipment→transmission line). The signal of exchange internal format transferred via an internal highway is sequentially latched into a 16-bit D-type flip-flop (D-F/F) 60 in blocks of 16 bits ($D_0$–$D_{15}$) starting from the TAG field at the rising edge of a synchronous clock signal. At the next rising edge of the clock after latching the TAG, the low-order four bits ($D_0$–$D_3$) of the latched TAG are latched into a 4-bit D-F/F 61 at the next stage, while at the same time, the next 2-byte data consisting of VPI/VCI, etc., is latched into the 16-bit D-F/F 60.

Only during this latch interval, the latch clock is cut off to a 16-bit D-F/F 64 at the final stage by a gate signal (GT) and an AND gate 62, so that the latched TAG data is discarded. A select signal (SEL) is sent to a selector 63 which then allows the signal latched in the 4-bit D-F/F 61 to be passed therethrough only for the next clock cycle; thus, the low-order four bits of the TAG are latched into the high-order four bits ($D_{12}$–$D_{15}$) of the final-stage D-F/F 64, the four bits corresponding to the GFC field, and the low-order 12 bits ($D_0$–$D_{11}$) of VPI/VCI, etc., previously latched in the D-F/F 60 are latched into the low-order 12 bits ($D_0$–$D_{11}$) of the D-F/F 64. Thereafter, the data latched in the D-F/F 60 is sequentially output through the final-stage D-F/F 64.

Conversely, FIG. 6 shows an example of a format converting circuit of the TAG controller 57 for converting the TAG field from the transmission line to the main equipment side (transmission line→equipment).

In FIG. 6, the signal of the UNI format (FIG. 3(C)) received via the transmission line is converted by the 8/16 converter 55 (FIG. 4) into 16-bit data ($D_0$–$D_{15}$) which is the directed to a 16-bit D-F/F 65. The data is sequentially latched into the D-F/Fs 65 and 68 by every rising edge of a clock signal (CLK).

Suppose here that the first two bytes (GFC plus VPI/VCI fields) of the UNI format signal are latched into the D-F/F 65. Then, the GFC field ($D_{12}$–$D_{15}$) is latched into a 4-bit D-F/F 67 with a delay of one half clock pulse by the action of an inverter 66. In the next clock period, a select signal (SEL) is given to a selector 69 which then allows the data latched in the D-F/F 67 and the TAG number or all "0" data given from the main equipment to be passed therethrough, the former being latched into the low-order four bits ($D_0$–$D_3$) and the latter into the high-order 12 bits of a 16-bit D-F/F 70 at the final stage. At the same time, the data in the D-F/F 65 is latched into a 16-bit D-F/F 68 at the next stage. The final-stage D-F/F 70 then outputs the TAG signal of the exchange internal format (FIG. 3(A)). Thereafter, the data transferred from the D-F/F 68 and passed through the selector 69 are sequentially output from the final-stage D-F/F 70. As described above, the invention provides a simple B-ISDN remote multiplexer constructed by separating a subscriber line interfacing circuit and a concentrator section from a usual ATM exchange and installing them at a remote location. This B-ISDN remote multiplexer carries out only transmission processing such as concentration and multiplexing, and signaling, switch connections, and other call servicing operations are all carried out at the exchange side. This makes it easy to reduce the size and cost of the equipment.

According to the invention, the switching processing software at the exchange need only carry out subscriber line serving operations as in the usual ATM exchange without having to consider the presence of the B-ISDN remote multiplexer; therefore, no special software need be added to implement the invention.

Furthermore, according to the invention, a simple interface conforming to the UNI (User Network Interface) standard, i.e., the standard interface defined by the B-ISDN, is used as the communication interface between the B-ISDN remote multiplexer of the above configuration and the ATM exchange. This allows the shared use and simplification of the equipment configuration, and can easily achieve reductions in equipment cost, etc.

We claim:

1. A broadband ISDN remote multiplexer for concentrating a plurality of broadband ISDN subscriber lines at a remote location for connection to an ATM exchange, comprising:

first interface means for carrying out conversion between a User Network Interface (UNI) format signal having a destination number in a Generic Flow Control (GFC) field thereof, which is transmitted on a transmission line connecting between said ATM exchange and said broadband ISDN remote multiplexer, and a first path-control signal that directs an interconnection corresponding to said destination number in said broadband ISDN remote multiplexer;

a plurality of subscriber line interface means for terminating respectively the plurality of broadband ISDN subscriber lines; and multiplexing/demultiplexing means for making a connection between said first interface means and each of said subscriber line interface means in accordance with said first path-control signal.

2. A broadband ISDN remote multiplexer according to claim 1, wherein said first path-control signal has a TAG field carrying internal connection information for said broadband ISDN remote multiplexer, said TAG field containing the destination number appended to the Generic Flow Control (GFC) field of said transmitted signal of User Network Interface (UNI) format.

3. A broadband ISDN remote multiplexer according to claim 2, wherein four bits in said TAG field represent the destination number appended to said Generic Flow Control (GFC) field.

4. A broadband ISDN remote multiplexer according to claim 3, wherein said multiplexing/demultiplexing means makes a selective connection to each of said subscriber line interface means in accordance with the destination number represented by the four bits in said TAG field.

5. A broadband ISDN remote multiplexer according to claim 3, wherein all the bits in said TAG field, excluding the four bits representing the 4-bit destination number, are set to 0.

6. A broadband ISDN remote multiplexer according to claim 3, wherein all the bits in said TAG field, excluding the four bits representing the 4-bit destination number, are used to represent TAG information internal to said broadband ISDN remote multiplexer.

7. A broadband ISDN remote multiplexer according to claim 2, wherein said TAG field consists of 16 bits.

8. A broadband ISDN remote multiplexer according to claim 1, further including second interface means for connection with each of said subscriber line interface means, said second interface means carries out conversion of format between a second path-control signal, which directs a connection with said ATM exchange, and the destination number appended to the Generic Flow Control (GFC) field of said transmitted signal of User Network Interface (UNI) format transmitted over said transmission medium.

9. A broadband ISDN remote multiplexer according to claim 8, wherein said second path-control signal has a TAG field carrying internal connection information for said ATM exchange, said TAG field containing the destination number appended to the Generic Flow Control (GFC) field of said transmitted signal of User Network Interface (UNI) format.

10. A broadband ISDN remote multiplexer according to claim 9, wherein four bits in said TAG field represents the destination number appended to said Generic Flow Control (GFC) field.

11. A broadband ISDN remote multiplexer according to claim 10, wherein all the bits in said TAG field, excluding said four bits, are used to represent TAG information internal to said ATM exchange.

12. A broadband ISDN remote multiplexer according to claim 11, wherein connection control of an ATM switch is performed in accordance with the TAG information comprised of remaining bits in said TAG field excluding said four bits.

13. A broadband ISDN remote multiplexer according to claim 9, wherein said TAG field consists of 16 bits.

14. A broadband ISDN remote multiplexer according to claim 1, wherein said first interface means comprises: physical interface means for interfacing with said transmission medium; terminating means for terminating said transmitted signal of User Network Interface (UNI) format; and first path-control means for interfacing with said multiplexing/ demultiplexing means by carrying out conversion between the destination number appended to the GFC field of said transmitted signal of User Network Interface (UNI) format and said first path-control signal.

15. A broadband ISDN remote multiplexer according to claim 14, wherein said first path-control means converts the destination number appended to the Generic Flow Control (GFC) field of said transmitted signal of User Network Interface (UNI) format and appends the destination number to a TAG field of said first path-control signal that directs an internal connection.

16. A broadband ISDN remote multiplexer according to claim 15, wherein said multiplexing/demultiplexing means makes a selective connection to each of said subscriber line interface means in accordance with the 4-bit destination number contained in said TAG field.

17. A broadband ISDN remote multiplexer according to claim 15, wherein the destination number appended to said Generic Flow Control (GFC) field is converted to four bits in said TAG field.

18. A broadband ISDN remote multiplexer according to claim 8, wherein said second interface means comprises: physical interface means for interfacing with said transmission medium; terminating means for terminating said transmitted signal of User Network Interface (UNI) format; and second path-control means for interfacing with an ATM switch by carrying out conversion between the destination number appended to the Generic Flow Control (GFC) field of said transmitted signal of User Network Interface (UNI) format and said second path-control signal.

19. A broadband ISDN remote multiplexer according to claim 18, wherein said second path-control means converts the destination number appended to the Generic Flow Control (GFC) field of said transmitted signal of User Network Interface (UNI) format and appends the destination number to a TAG field of said second path-control signal that directs an internal connection.

20. A broadband ISDN remote multiplexer according to claim 19, wherein the destination number appended to said Generic Flow Control (GFC) field is converted to four bits in said TAG field.

21. A broadband communication network remote multiplexer for concentrating a plurality of broadband communication network subscriber lines at a remote location for connection to an exchange for a broadband communication network, comprising:

a plurality of subscriber line interface means for terminating respectively the plurality of broadband communication network subscriber lines;

first interface means located between said subscriber interface means and exchange for a broadband communication network, and having functions for carrying out the conversion between a signal transmitted on a transmission medium connecting between said subscriber interface means and exchange for a broadband communication network, and a first path-control signal that controls a path connection within said subscriber interface means, and for replacing a destination number directing accommodating location data of a subscriber and contained in a header of said transmitted signal with destination field data contained in a header of said first path-control signal; and multiplexing/demultiplexing means for making a connection between said first interface means and each of said subscriber line interface means in accordance with said first path-control signal.

22. A broadband communication network remote multiplexer according to claim 21, wherein said first path-control signal has a header contained in a predetermined interface format used for an exchange and a multiplexer and for carrying internal connection information for said broadband communication network remote multiplexer, said header containing the destination number appended to a header field used for carrying said transmitted signal having a predetermined user-network interface format that includes a header field and an information field.

* * * * *